(12) United States Patent
Ho et al.

(10) Patent No.: US 9,584,565 B1
(45) Date of Patent: Feb. 28, 2017

(54) METHODS FOR GENERATING NOTIFICATIONS IN A SHARED WORKSPACE

(71) Applicant: Google Inc., Mountain View, CA (US)

(72) Inventors: Ronald Ho, Freemont, CA (US); Omar Lee, Berkeley, CA (US); Aruna Balakrishnan, San Francisco, CA (US); Rahul Sood, Los Altos, CA (US); Camie Hackson, Sunnyvale, CA (US); Lucas Visvikis Pettinati, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 220 days.

(21) Appl. No.: 14/048,142

(22) Filed: Oct. 8, 2013

(51) Int. Cl.
*H04L 29/06* (2006.01)
*H04L 29/12* (2006.01)
*G06F 3/048* (2013.01)

(52) U.S. Cl.
CPC .......... *H04L 65/403* (2013.01); *G06F 3/048* (2013.01)

(58) Field of Classification Search
CPC ......... H04L 12/24; H04L 29/06; H04L 41/00; H04L 67/24
See application file for complete search history.

(56) References Cited

U.S. PATENT DOCUMENTS

| | | |
|---|---|---|
| 5,002,491 A | 3/1991 | Abrahamson et al. |
| 5,596,700 A | 1/1997 | Darnell et al. |
| 5,826,025 A | 10/1998 | Gramlich |
| 5,930,801 A | 7/1999 | Falkenhainer et al. |
| 6,064,856 A | 5/2000 | Lee et al. |
| 6,222,535 B1 | 4/2001 | Hurd, II |
| 6,389,434 B1 | 5/2002 | Rivette et al. |
| 6,411,310 B1 | 6/2002 | Berquist et al. |
| 6,438,566 B1 | 8/2002 | Okuno et al. |

(Continued)

FOREIGN PATENT DOCUMENTS

| | | |
|---|---|---|
| WO | WO2005091247 A1 | 9/2005 |
| WO | WO2009032013 A1 | 3/2009 |

(Continued)

OTHER PUBLICATIONS

Lowell Heddingsat at http://www.howtogeek.com/howto/microsoft-office/stop-hitting-snooze-change-the-default-reminder-time-for-outlook-appointments/ dated: Apr. 25, 2008 ("Heddingsat").*

(Continued)

*Primary Examiner* — Yongjia Pan
*Assistant Examiner* — F J Farhadian
(74) *Attorney, Agent, or Firm* — Young Basile Hanlon & MacFarlane, P.C.

(57) ABSTRACT

A method includes providing, by a server computer, a shared workspace for facilitating collaborative work by a plurality of users. The method also includes monitoring information associated with the shared workspace, the information relating to each user from the plurality of users. The method also includes determining whether a notification definition is satisfied, the notification definition based at least in part on the information associated with the shared workspace, and outputting, for display to at least one user from the plurality of users, a notification, in response to determining that the notification definition is satisfied.

8 Claims, 7 Drawing Sheets

(56) References Cited

U.S. PATENT DOCUMENTS

| | | | |
|---|---|---|---|
| 6,519,763 B1* | 2/2003 | Kaufer | G06Q 10/109 706/21 |
| 6,687,878 B1 | 2/2004 | Eintracht et al. | |
| 6,721,921 B1 | 4/2004 | Altman | |
| 6,732,179 B1 | 5/2004 | Brown et al. | |
| 6,733,295 B2 | 5/2004 | Stuppy et al. | |
| 7,315,826 B1* | 1/2008 | Guheen | G06F 17/3089 703/27 |
| 7,689,563 B1 | 3/2010 | Jacobson | |
| 7,747,588 B2 | 6/2010 | Thompson et al. | |
| 7,821,405 B2* | 10/2010 | Heidloff | G06F 17/30516 340/573.1 |
| 7,870,193 B2* | 1/2011 | Hintermeister | G06Q 10/10 709/204 |
| 7,966,556 B1 | 6/2011 | Bourdev | |
| 8,000,453 B2 | 8/2011 | Cooper et al. | |
| 8,121,874 B1* | 2/2012 | Guheen | G06Q 10/063 705/28 |
| 8,171,404 B2 | 5/2012 | Borchers et al. | |
| 8,385,810 B2 | 2/2013 | Nolasco | |
| 8,386,929 B2 | 2/2013 | Zaika et al. | |
| 8,545,232 B1 | 10/2013 | Bardige et al. | |
| 8,666,056 B2* | 3/2014 | Makagon | G06Q 10/0631 379/265.01 |
| 9,077,803 B2* | 7/2015 | Makagon | G06Q 10/0631 |
| 2002/0029161 A1* | 3/2002 | Brodersen | G06Q 10/06 705/7.14 |
| 2002/0078088 A1 | 6/2002 | Kuruoglu et al. | |
| 2002/0192631 A1 | 12/2002 | Weir et al. | |
| 2003/0050986 A1 | 3/2003 | Matthews et al. | |
| 2003/0059761 A1 | 3/2003 | Patterson | |
| 2003/0106020 A1 | 6/2003 | Silverbrook et al. | |
| 2003/0110228 A1* | 6/2003 | Xu | G06Q 10/10 709/207 |
| 2003/0135554 A1 | 7/2003 | Bellotti et al. | |
| 2003/0142126 A1 | 7/2003 | Estrada et al. | |
| 2003/0167167 A1 | 9/2003 | Gong | |
| 2003/0177194 A1 | 9/2003 | Crocker et al. | |
| 2003/0200258 A1 | 10/2003 | Hayashi et al. | |
| 2003/0204490 A1 | 10/2003 | Kasriel | |
| 2004/0021686 A1 | 2/2004 | Barberis | |
| 2004/0030567 A1 | 2/2004 | Takeshita et al. | |
| 2004/0060375 A1 | 4/2004 | Kumar et al. | |
| 2004/0093346 A1 | 5/2004 | Hochman | |
| 2004/0122693 A1 | 6/2004 | Hatscher et al. | |
| 2004/0122843 A1 | 6/2004 | Terris et al. | |
| 2004/0201602 A1 | 10/2004 | Mody et al. | |
| 2005/0060375 A1 | 3/2005 | Ernest et al. | |
| 2005/0114036 A1 | 5/2005 | Fruhling et al. | |
| 2006/0004914 A1 | 1/2006 | Kelly et al. | |
| 2006/0059253 A1* | 3/2006 | Goodman | G06Q 10/10 709/223 |
| 2006/0168315 A1 | 7/2006 | Daniell et al. | |
| 2006/0194184 A1 | 8/2006 | Wagner | |
| 2006/0224735 A1 | 10/2006 | Hill et al. | |
| 2006/0257841 A1 | 11/2006 | Mangano | |
| 2006/0294455 A1 | 12/2006 | Morris et al. | |
| 2007/0162907 A1* | 7/2007 | Herlocker | G06Q 10/10 718/100 |
| 2007/0172806 A1 | 7/2007 | Stuppy | |
| 2008/0013705 A1* | 1/2008 | Yoffie | G06Q 10/109 379/201.12 |
| 2008/0014569 A1 | 1/2008 | Holiday et al. | |
| 2008/0021757 A1* | 1/2008 | Majd | G06Q 10/063114 705/7.15 |
| 2008/0057480 A1 | 3/2008 | Packard et al. | |
| 2008/0256250 A1 | 10/2008 | Wakefield | |
| 2009/0125798 A1 | 5/2009 | Morris et al. | |
| 2009/0125834 A1 | 5/2009 | Morris et al. | |
| 2009/0157608 A1 | 6/2009 | Strathearn et al. | |
| 2009/0181356 A1 | 7/2009 | Dasgupta | |
| 2009/0282009 A1 | 11/2009 | Levey et al. | |
| 2009/0291426 A1 | 11/2009 | Polivka | |
| 2010/0100967 A1 | 4/2010 | Douglas et al. | |
| 2010/0162135 A1 | 6/2010 | Wanas et al. | |
| 2010/0185474 A1* | 7/2010 | Frank | G06Q 10/063114 705/7.15 |
| 2010/0289906 A1 | 11/2010 | Kaye et al. | |
| 2011/0202611 A1 | 8/2011 | Malik et al. | |
| 2011/0208822 A1* | 8/2011 | Rathod | G06Q 30/02 709/206 |
| 2011/0225293 A1* | 9/2011 | Rathod | G06F 17/30867 709/224 |
| 2011/0276396 A1* | 11/2011 | Rathod | G06F 17/30867 705/14.49 |
| 2011/0318724 A1 | 12/2011 | Labine et al. | |
| 2012/0192086 A1* | 7/2012 | Ghods | G06Q 10/10 715/753 |
| 2012/0198414 A1* | 8/2012 | Chen | G06Q 50/01 717/102 |
| 2012/0265596 A1 | 10/2012 | Mazed et al. | |
| 2012/0271676 A1 | 10/2012 | Aravamudan et al. | |
| 2012/0287988 A1 | 11/2012 | Chong et al. | |
| 2012/0329029 A1 | 12/2012 | Rauta | |
| 2013/0036118 A1 | 2/2013 | Morris et al. | |
| 2013/0244219 A1 | 9/2013 | Roers | |
| 2013/0247055 A1* | 9/2013 | Berner | G06Q 10/00 718/102 |
| 2013/0342315 A1* | 12/2013 | Verstraete | G08B 5/00 340/7.51 |
| 2014/0074629 A1* | 3/2014 | Rathod | G06Q 10/10 705/14.73 |
| 2014/0129942 A1* | 5/2014 | Rathod | H04N 21/44222 715/720 |
| 2015/0118672 A1 | 4/2015 | Yeskel et al. | |

FOREIGN PATENT DOCUMENTS

| | | |
|---|---|---|
| WO | WO2013086513 A2 | 6/2013 |
| WO | WO2013103947 A2 | 7/2013 |

OTHER PUBLICATIONS www.google.com/landing/now, internet web page.
Activity-centric collaboratin tools on Lotusphere menu, printed out in year 2008.
Beyond predictable workflows: Enhancing productivity in artful business processes; Hill et al., year 2006.
Dynamic partial prefetch ranking in Hypermedia neighborhood; Javed I. Khan; year 2000.
Edmodo, "Assignments," https://support.edmodo.com/home#forums/20796115-assignments, Aug. 13, 2013.
Edmodo, "Badges," https://support.edmodo.com/home#forums/20805855-badges, Aug. 13, 2013.
Edmodo, "Discover," https://support.edmodo.com/home#forums/20898420-discover, Aug. 13, 2013.
Edmodo, "Insights and Reactions," https://support.edmodo.com/home#forums/20904990-insights-and-reactions, Aug. 13, 2013.
Edmodo, "Quizzes," https://support.edmodo.com/home#forums/20887530-quizzes, Aug. 13, 2013.
Edmodo, "Turn in Assignments," https://support.edmodo.com/home#forums/20806465-turn-in-assignments, Aug. 13, 2013.
Edmodo, "Use Your Backpack," https://support.edmodo.com/home#forums/20898990-use-your-backpack, Oct. 2, 2013.
Edmodo, "Your Google Drive," https://support.edmodo.com/home#forums/20796059-your-google-drive, Aug. 13, 2013.
Edmodo, "Your Library", https://support.edmodo.com/home#forums/20795335-your-library, Aug. 13, 2013.
Efficient evaluation of shared predicates for XForms page access control Eunjung Lee,; Kyong-Jin Seo,; Tencon 2008-2008, Tencon 2008. IEEE Region 10 Conference Nov. 19-21, 2008, pp. 1-6.
Employee connection; Australian tax office leverages technology to build culture and community; printed out in year 2008.
Going (Quick)Places with Charlie Hill, printed out in year 2008.
HAPARA, "Teacher Dashboard," hapara.com/teacher-dashboard-for-google-apps/.
IPRP of the International Searching Authority for International Application No. ISR/US2013/065870 dated May 28, 2015, 12 pages.

(56) References Cited

OTHER PUBLICATIONS

ISR Written Opinion of the International Searching Authority and ISR for International Application No. PCT/US2014/062061 mailed on May 20, 2015.

Knowledge access control policy language model for virtual enterprises Tsung-Yi Chen; Yuh-Min Chen; Hui-Chuan Chu; Chui-Cheng Chen; Industrial Engineering and Engineering Management, 2007 IEEE International Conference on Dec. 2-4, 2007, pp. 1903-1907.

Schoology's Educational Solutions, "Not Your Typical Learning Management System," https://www.schoology.com/learning-management-system.php.

ThinkFree, Corp. Administration Guide: ThinkFree Server, Jan. 30, 2009.

Windows NT Server 4.0 Concepts and Planning Manual, Chapter 4—Managing Shared Resources and Resource Security, as printed out in year 2008.

A Language Extension for Controlling Access to Shared Data Jones, A.K.; Liskov, B.H.; Software Engineering, IEEE Transactions on vol. SE-2, Issue 4, Dec. 1976 pp. 277-285.

* cited by examiner

METHODS FOR GENERATING NOTIFICATIONS IN A SHARED WORKSPACE

BACKGROUND

The disclosure herein relates generally to generating notifications in computer software applications that facilitate collaborative work among a group of users, which are referred to herein as "shared workspaces."

Shared workspaces allow a group of users to work collaboratively on a project. For example, shared workspaces can allow shared access to files, provide task management capabilities, and provide ways for team members to communicate with one another. Access to a shared workspace is typically limited to specified users who have been granted access to the shared workspace.

SUMMARY

The disclosure relates to generating notifications in a shared workspace.

One aspect of the disclosed embodiments is a method that includes providing, by a server computer, a shared workspace for facilitating collaborative work by a plurality of users. The method also includes monitoring information associated with the shared workspace, the information relating to each user from the plurality of users. The method also includes determining whether a notification definition is satisfied. The notification definition is based at least in part on the information associated with the shared workspace, and outputting, for display to at least one user from the plurality of users, a notification, in response to determining that the notification definition is satisfied.

Another aspect of the disclosed embodiments is a method that includes providing, by a server computer, a shared workspace for facilitating collaborative work by a plurality of users. The shared workspace includes a document storage system and an event scheduling system. The method also includes analyzing file contents for one or more files stored at the document storage system, and analyzing event information from the event scheduling system. The method further includes determining whether a notification definition is satisfied, the notification definition based in part on the file contents and is based further in part on the event information, and outputting, for display to at least one user from the plurality of users, a notification, in response to determining that the notification definition is satisfied.

Another aspect of the disclosed embodiments is a method that includes providing, by a server computer, a shared workspace for facilitating collaborative work by a plurality of users. The shared workspace includes a document editing system and an event scheduling system. The method also includes analyzing document editing activity from the document editing system, and analyzing event information from the event scheduling system. The method also includes determining whether a notification definition is satisfied. The notification definition is based in part on the document editing activity and is based further in part on the event information. The method also includes outputting, for display to at least one user from the plurality of users, a notification, in response to determining that the notification definition is satisfied.

Another aspect of the disclosed embodiments is a method that includes providing, by a server computer, a shared workspace for facilitating collaborative work by a plurality of users. The shared workspace includes a task tracking system and an event scheduling system. The method also includes analyzing task tracking information from the task tracking system, and analyzing event information from the event scheduling system. The method also includes determining whether a notification definition is satisfied. The notification definition is based in part on the task tracking information and is based further in part on the event information. The method also includes outputting, for display to at least one user from the plurality of users, a notification, in response to determining that the notification definition is satisfied.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for generating notifications in a shared workspace are disclosed herein. When working with a group on a project using a shared workspace, keeping track of all of activities of the group can be difficult, and important information may be overlooked. The systems and methods herein monitor information generated by user activities within the shared workspace to provide meaningful insights based on information culled from different types of activities, and culled from actions taken by multiple users from the group.

Figure 1:
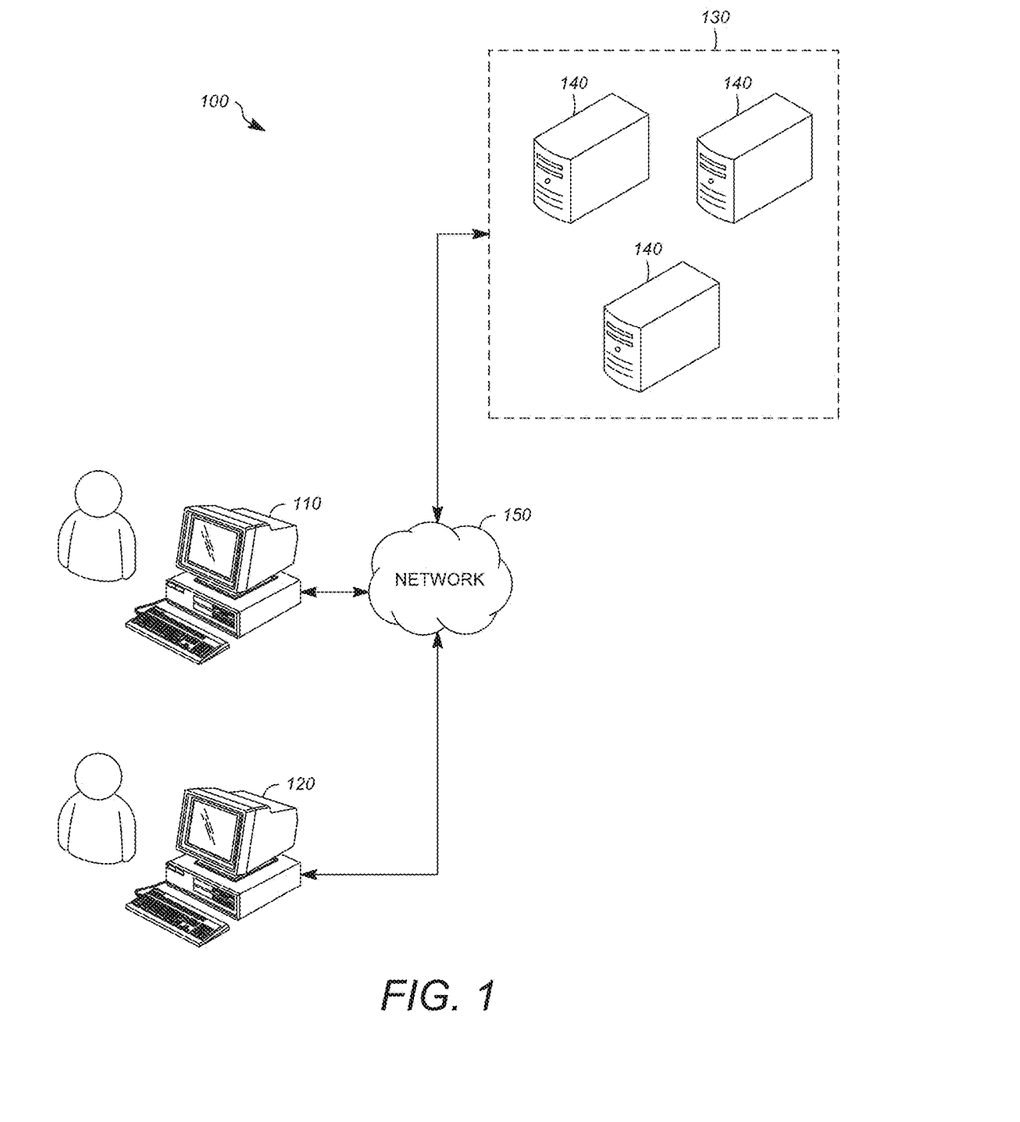
FIG. 1 is a block diagram showing an example of an environment in which a system for generating notifications in a shared workspace can be implemented.

FIG. 1 shows an example of an environment 100 in which a system for generating notifications in a shared workspace can be implemented. The environment 100 can include a user system 110, one or more additional group member systems 120, and a workspace service 130. The user system 110 and the additional group member systems 120 are each representative of a large number (e.g. millions) of systems that can be included in the environment 100, with each system participating in one or more groups of users that are working collaboratively via a shared workspace that is facilitated within by environment. The user system 110 and the additional group member systems 120 can each be any manner of computer or computing device, such as a desktop computer, a laptop computer, a tablet computer, or a smartphone (a computationally-enabled mobile telephone). The workspace service 130 can be implemented using one or more server computers 140. The user system 110, the additional group member systems 120, and the workspace service 130 can each be implemented as a single system, multiple systems, distributed systems, or in any other form.

The systems, services, servers, and other computing devices described herein are in communication via a network 150. The network 150 can be one or more communications networks of any suitable type in any combination, including wireless networks, wired networks, local area networks, wide area networks, cellular data networks, and the internet.

The workspace service 130 provides a shared workspace to a defined group of users including operators associated with the user system 110 and the additional group member systems 120. As used herein, a shared workspace is any manner of system, program, or interface that allows a defined group of users to utilize an access-restricted system in which information can be shared between users for the purpose of collaboratively working on a project. As will be discussed herein, shared workspaces can implement document storage functions, document creation and editing functions, messaging functions, discussion functions, event scheduling functions, and task tracking functions. In some implementations, the workspace service 130 allows a particular shared workspace to be accessed upon presentation of a credential, such as a username and password combination, that are associated with a registered user of that particular shared workspace. In some implementations, one or more users of each shared workspace are able to grant access to additional users or revoke access from existing users.

Figure 2:
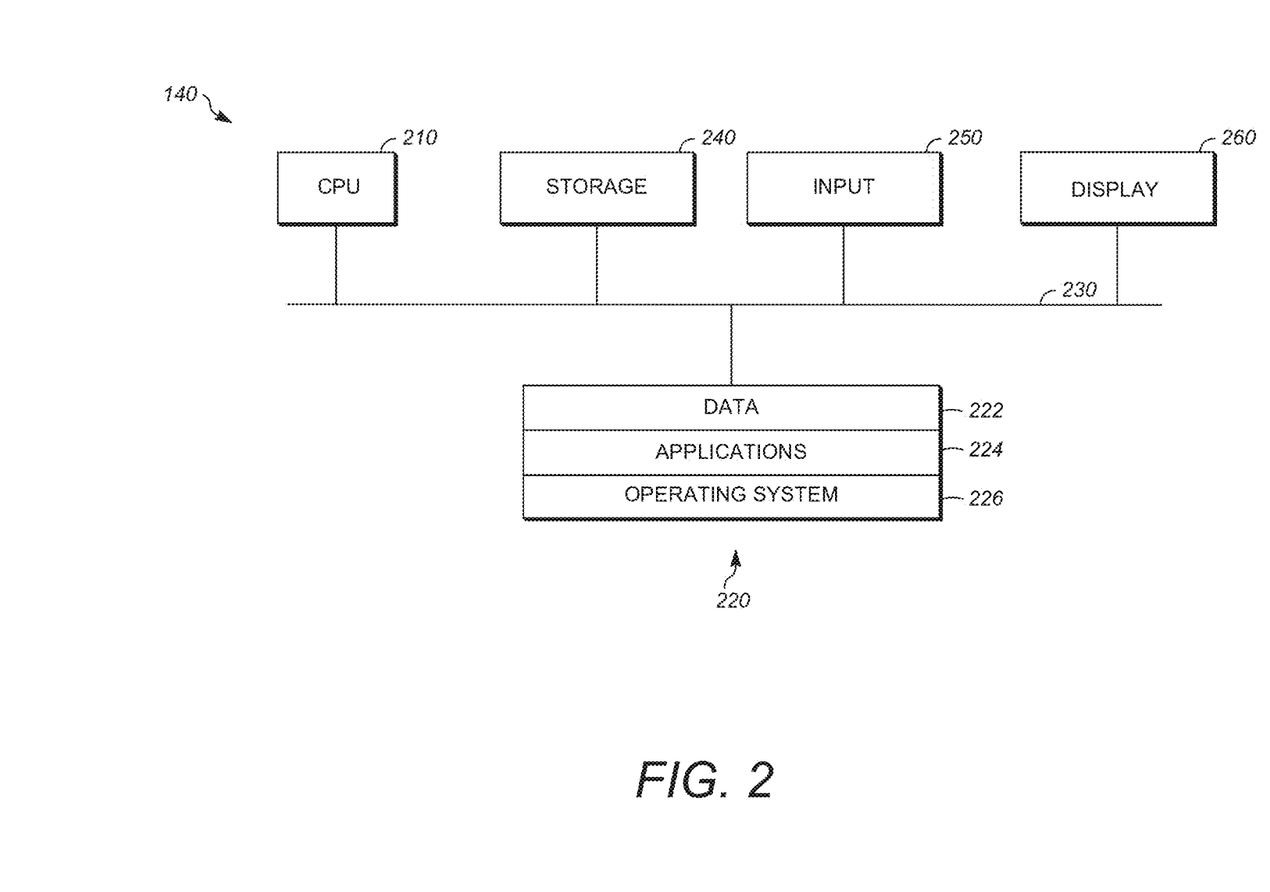
FIG. 2 is a block diagram showing an example of a hardware configuration for a server computer.

FIG. 2 is a block diagram of an example of a hardware configuration for the one or more server computers 140. The same hardware configuration or a similar hardware configuration can be used to implement the user system 110 and the additional group member systems 120. Each server computer 140 can include a CPU 210. The CPU 210 can be conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 140 can be composed of multiple buses. Further, the storage device 240 can be directly coupled to the other components of the respective one of the server computers 140 or can be accessed via a network and can comprise a single integrated unit such as a memory card or multiple units such as multiple memory cards. The one or more server computers can thus be implemented in a wide variety of configurations.

Figure 3:
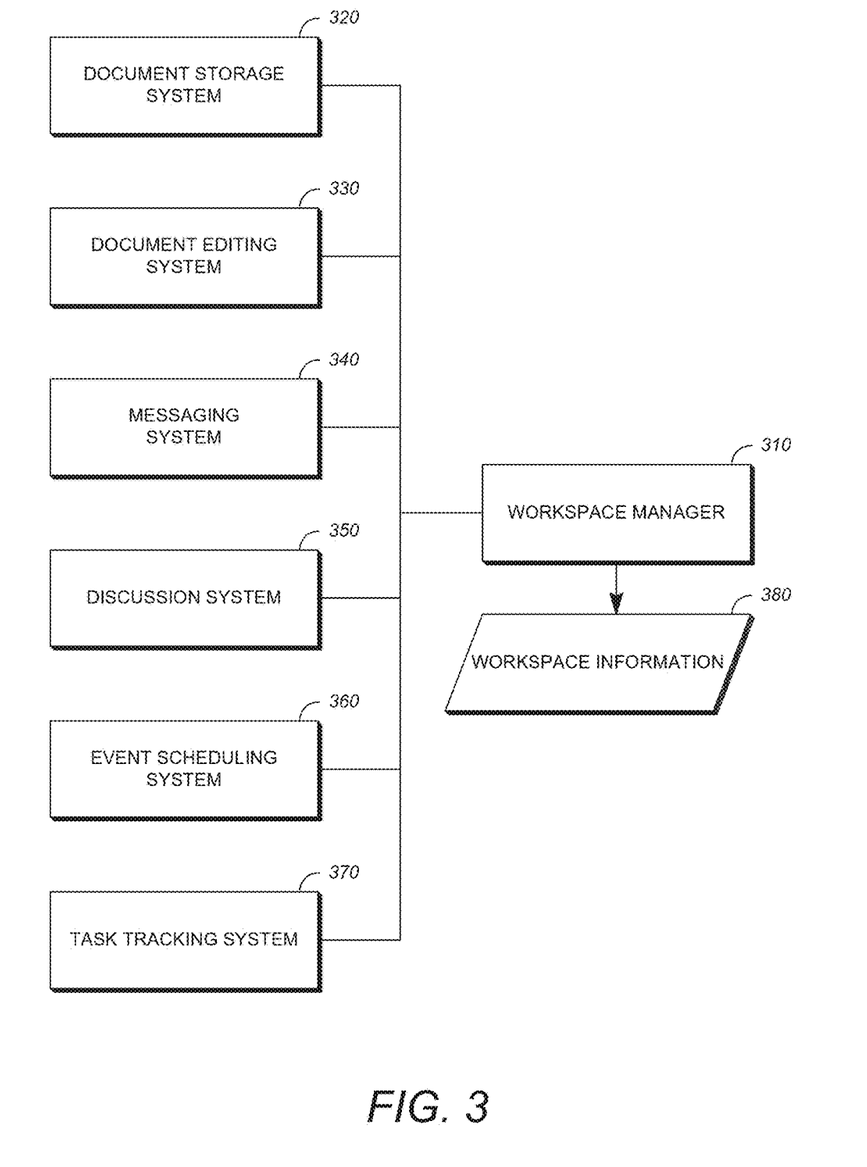
FIG. 3 is a block diagram showing components of a workspace service.

FIG. 3 is a block diagram showing components that can be included in the workspace service 130. Each of these components can be, for example provided in the form of software instructions that are executed by the one or more server computers 140 of the workspace service 130.

A workspace manager 310 is provided to oversee and coordinate the operations performed by other components of the workspace service 130. For example, the workspace manager 310 can allow for creation of new projects, for adding or removing users as group members for those projects, for providing user interfaces that display information relating to the project and representative of information that is provided to the workspace manager 310 by the various other components of the workspace service 130. As will further be described herein, the workspace manager 310 is operable to receive information from the other components of the workspace service 130 and thereby monitor information that is associated with the shared workspace, where the information that is monitored by the workspace manager 310 represents actions taken by each group member for a particular project in using any of the components of the workspace service 130.

The workspace service 130 can include a document storage system 320. The document storage system 320 provides shared file access for the shared workspace. For each shared workspace hosted at the workspace service 130, the document storage system 320 stores files that are associated with the respective shared workspace and allows the users that have been granted access to that shared workspace to access those files at the document storage system 320. The document storage system 320 can monitor actions taken by the users of the shared workspace at the document storage system 320. For example, the document storage system 320 can monitor which files are accessed, when those files are accessed, the identity of the user accessing each file, and the duration over which each file was accessed. This information can be provided to the workspace manager 310. The document storage system 320 can further provide the workspace manager 310 with one or more of the files stored at the document storage system 320 for analysis by the workspace manager 310 as to the substantive content of the file.

The workspace service 130 can include a document editing system 330. The document editing system 330 is operable to allow creation of files for later storage at the document storage system 32 or can be utilized to edit previously-created files that are retrieved from the document storage system 320 or from an external location. As an example, the document editing system can be a word processing application. As another example, the document editing system can be a spreadsheet application. As another example, the document editing system can be a presentation application. As another example, the document editing system can be a graphic design application. Other types of applications can be provided as the document editing system 330. The document editing system 330 can provide information regarding document editing activity to the workspace manager 310. As an example, the information regarding document editing activity can include information describing the duration over which a document was edited, the extent of edits performed with respect to a document, such as, for example, the number of characters added or modified in a word processing document, or the substantive content of the portions of a document that are added or modified at the document editing system 330 during a document editing session. Other types of information could be provided to the workspace manager 310 by the document editing system regarding document editing activities performed using the document editing system 330.

The workspace service 130 can further include a messaging system 340. The messaging system 340 can be an application that allows communication between the users of a particular shared workspace. As one example, the messaging system 340 can be a text based chat application. As another example, the messaging system 340 can be a voice chat application. As another example, the messaging system 340 can be a video conferencing application. The messaging system 340 can provide information to the workspace manager 310 regarding messaging activities performed using the messaging system 340. As one example, the messaging system 340 can provide information describing the occurrence of a messaging session, such as a video conference, that occurs between multiple group members. The messaging system 340 can also provide messaging activity information to the workspace manager 310 identifying the users that participated in a particular messaging session. The messaging system 340 can also generate a transcript of a particular messaging system and transmit it to the workspace manager 310 for substantive analysis, such that a particular messaging session can be correlated to other activities performed within the shared workspace. Other types of information can be provided to the workspace manager 310 from the messaging system 340 as the messaging activity information by describing any aspect of the operation of the messaging system 340.

The workspace service 130 can also include a discussion system 350. The discussion system can allow for long term discussions regarding a topic, where the discussions occur in the form of a series comments or posts by the users of the shared workspace, and do not necessarily occur in real-time. The workspace service 130 can provide a dedicated interface for discussions and/or an interface for providing discussions that relate to and are shown in conjunction with other assets managed by and within the shared workspace, such as documents, tasks, or events. Thus, when a user views an event, a discussion regarding the event can be shown alongside the event. Discussion information regarding comments, posts, and other types of discussions can be stored by the discussion system 350 and provided to the workspace manager 310.

The workspace service 130 can also include an event scheduling system 360. The event scheduling system 360 can provide a means by which group members of the shared workspace can schedule events and view those events on a calendar-type interface. The event scheduling system 360 can provide event information to the workspace manager 310, such as information describing events that have been scheduled using the event scheduling system 360, as well as any substantive content that is associated with those events.

The workspace service 130 can further include a task tracking system 370. The task tracking system 370 allows tasks to be created, assigned to one or more users, and tracked using status indicators that provide information as to whether each task has been completed by the user or users to which it was assigned. The task tracking system 370 can provide task information to the workspace manager 310. For example, the task information can describe the tasks that are tracked at the task tracking system 370, as well as the person(s) associated with each task, and the status of each task.

Other types of components can be included as part of the workspace service 130 and other types of information can be provided to the workspace manager 310. As one example, location information regarding a current location of each of the users of the shared workspace could be provided to the workspace manager 310. As another example, information related to electronic mail messages relating to the project associated with the shared workspace could be provided to the workspace manager 310. Numerous other examples are possible, and thus, any information regarding activities taken by users of the shared workspace in the context of the shared workspace, or one of its constituent components can be tracked by the workspace manager 310.

The information that is received by the workspace manager 310 from the various components of the workspace service 130 can be aggregated and stored as workspace information 380. The workspace information 380 is information regarding the activities of some or all of the users of the shared workspace across the multiple components of the workspace service 130.

The workspace information 380 can be, as an example, a collection of information describing actions taken by the users of the shared workspace. In addition, the workspace information can include textual information written by the users in the context of, for example, the document editing system 330, the messaging system 340, and the discussion system 350. This textual information can be aggregated and utilized as a basis for triggering notifications, as will be described further herein.

Figure 4:
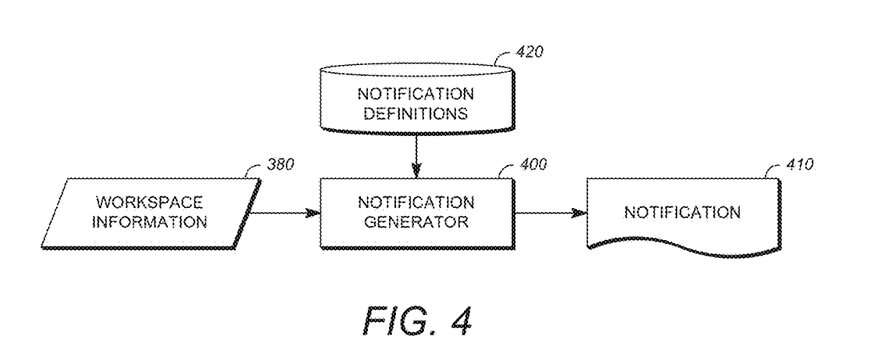
FIG. 4 is a block diagram showing operation of a notification generator.

FIG. 4 is a block diagram showing operation of the notification generator 400. The notification generator 400 can be implemented in the form of computer program instructions that are executed by the one or more server computers 140 of the workspace service 130. The notification generator 400 can receive the workspace information 380 as an input and generate a notification 410 as an output. The notification 410 can be in the form of instructions or other information that can be transmitted to the user system 110 for causing a notification message or image to be output for display at the user system 110, as will be explained further herein.

The notification generator 400 can utilize notification definitions 420 that each describe a notification that can be output for display to the user, the types of information that can be considered when determining whether the notification definition is satisfied, and the conditions under which the notification definition 420 is satisfied. When the notification definition is satisfied, the notification that is described by the notification definition 420 can be output for display. There are many possible conditions that can be evaluated using the workspace information, either by utilizing a single type of information to determine whether a condition is satisfied, or by utilizing multiple pieces of information to determine whether a condition is satisfied, such as relatedness of two different pieces of information derived from different components of the workspace service 130. Notification definitions 420 are considered to be satisfied when the notification generator determines that the notification described by a particular notification condition should be output for displayed based on the conditions or other information provided by the notification definition that describe the circumstances under which the notification should be displayed. In a simple example, a notification definition could be satisfied based on a determination that a set of pre-defined conditions are met. In other examples, whether some or all of the notification definitions are satisfied can be based on a ranking that considers the workspace information 380 in conjunction with factors such as relevancy, user behavior, pattern analysis, and user specified preferences.

As one example, a notification definition could include, as a necessary condition, that an event is scheduled to occur within a specified period of time. As another example, a notification definition could include, as a necessary condition, that no new tasks were created during a specified time frame. As another example, a notification definition could include, as a necessary condition, that some or all of the users of the shared workspace do not have an event scheduled at a particular time. As another example, a notification definition could include, as a necessary condition, that a user has performed a high number of actions that relate to a specific topic. As another example, a notification definition could be satisfied based on a semantic analysis of textual information written by the users that is included in the workspace information.

The notification generator utilizes the workspace information 380 to determine whether the notification definitions are satisfied. Thus the notification generator 400 can process some or all of the notification definitions 420, in each case using some or all of the workspace information and one of the notification definitions 420 as inputs. For each of the notification definitions 420 that is satisfied, the notification 410 can be output for display, such as by transmission of information from the workspace service 130 to the user system 110 that, when interpreted by the user system 110, causes the notification 410 to be output for display at the user system 110.

In one implementation, the notification generator 400 operates in real-time, by processing the notification definitions 420 based on the workspace information 380 while the user system 110 is utilizing the workspace service 130. In addition, processing of specific rules can be triggered by changes to related types of information. For example, execution of one of the notification definitions 420 that depends upon event information can be processed by the notification generator in response to a change in the event information. In another implementation, the notification definitions can be processed without regard to whether the user system 110 is currently utilizing the workspace service 130. For example, the notification definitions can be processed for a particular workspace or for particular users of a workspace on a predetermined schedule, or on a rolling queue-based schedule based on availability of the notification generator 400.

Figure 5:
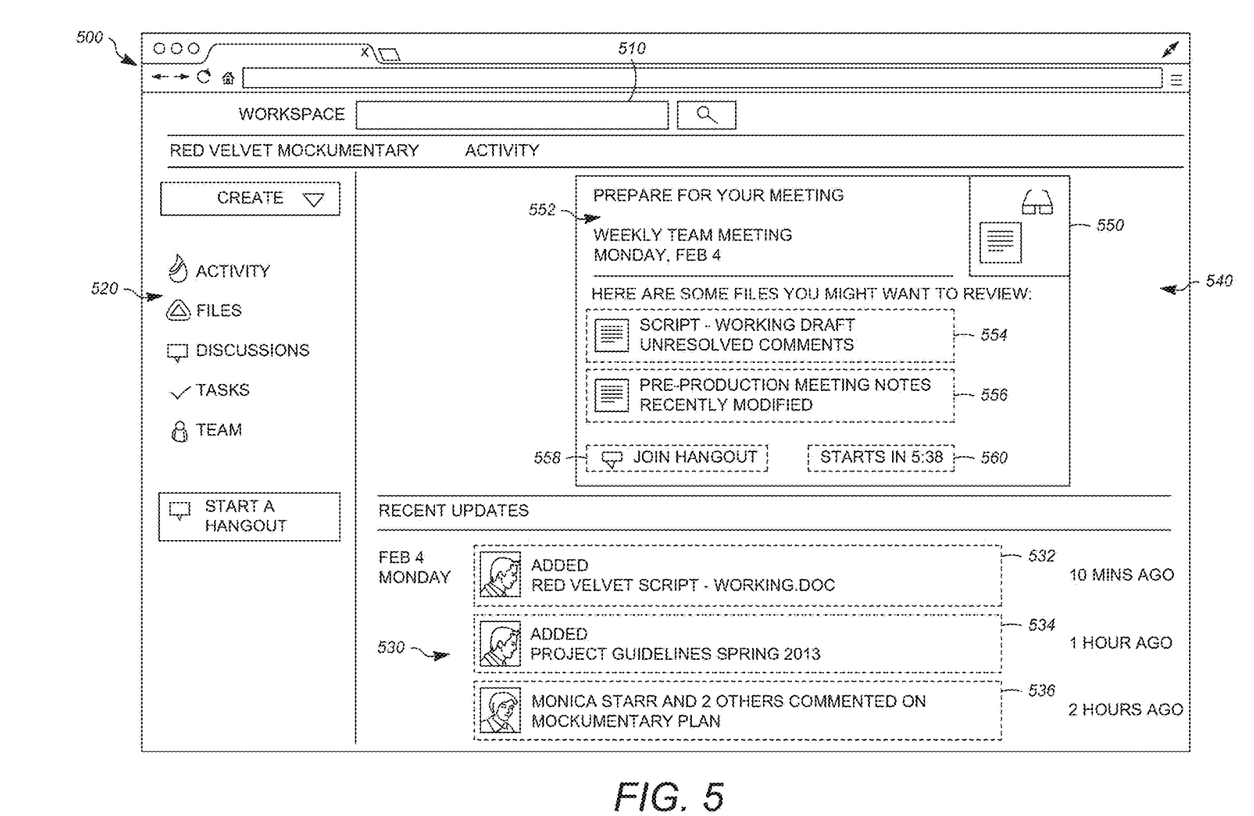
FIG. 5 is an illustration showing an example of a workspace interface screen.

FIG. 5 shows an example of workspace interface screen 500. In the illustrated example, the workspace interface screen 500 is displayed in the context of a web browser and can be, for example, a webpage encoded in a markup language such as HTML that is transmitted from the workspace service 130 to the user system 110 and output for display at the user system 110. In other examples, the workspace interface screen can be presented in a different type of application, such as a standalone application.

The workspace interface screen 500 can include interface elements that allow users of the shared workspace to utilize the various functions and components of the shared workspace. By way of example, the workspace interface screen 500 can include a search box 510 that allows users to execute search queries with respect to the information relating to the shared workspace. As another example, the workspace interface screen 500 can include a menu 520 that allows users to access the functions of the various components provided by the shared workspace. As another example, the workspace interface screen 500 can include an update area 530 in which update objects 532, 534, 536 are output for display. The update objects 532, 534, 536 include information relating to usage of the shared workspace, such as addition of files to the shared workspace, modification of files in the shared workspace, the presence of new comments or discussions, creation of new tasks, and other types of information derived from actions taken by the users of the shared workspace.

The workspace interface screen 500 includes a notification area 540. Notifications regarding information relating to the shared workspace, such as the notification 410 of FIG. 4, can be output for display in the notification area 540. In the illustrated example, a first example notification card 550 is output for display in the notification area 540.

The first example notification card 550 can include a notification message 552. In the illustrated example, the notification message 552 advises the user to "prepare for your meeting," identifies a meeting based on, for example, a pre-exiting event described by event information from the event scheduling system 360, and identifies the time at which the meeting is scheduled to occur.

The first example notification card 550 can include a reference to one or more files that are stored at the document storage system 320 and, in the illustrated example, includes interface elements 554, 556 for accessing documents that are stored at the document storage system. The first example notification card 550 indicates to the user that the files referenced by the interface elements 554, 556 are files that the user may wish to review in advance of the meeting that is referenced by the notification message 552. The files that are referenced by the interface elements 554, 556 can be identified based on the workspace information 380 using, for example, information from the document storage system showing that the files have been accessed by one or more of the users of the shared workspace in advance of the meeting or information representing the substantive content of the documents that are stored at the document storage system 320, upon determining that the topic of the event referenced by the notification message 552 is substantively related to the subject matter described in the documents referenced by the interface elements 554, 556.

Additional interface elements and information can be included in the first example notification card 550. For example, the first example notification card 550 can include an interface element 558 for causing the user to join the meeting referenced by the notification message 552, such as by video conference. Additional information that is included in the first example notification card 550 can include a countdown timer 560, which shows the amount of time remaining before the meeting that is referenced in the notification message 552.

The first example notification card 550 can be output for display in response to determining that a notification definition is satisfied, as described in connection with the notification generator 400 of FIG. 4. The notification definition is based, at least in part, on usage information regarding usage of the shared workspace by the users of the shared workspace, as described with respect to the workspace information 380. As an example, the first example notification card 550 can be output for display in response to determining that a notification definition is satisfied, where the notification definition is based, in part, on event information from the event scheduling system 360 that identifies that a meeting will occur in the near future, as well as based on information from the document storage system 320 and/or the document editing system 330, where the information indicates that one or more files that are stored at the document storage system 320 are relevant to the topic of the meeting described by the information obtained from the event scheduling system 360. Relevance of the one or more files to the meeting can be based on, for example, a similarity ranking for the files in the document storage system 320 with respect to the event information, such as a description of the meeting that is included in the event information. In order to generate a similarity ranking, one or more files are accessed from the document storage system, and the contents of the files are processed using a ranking algorithm, according to well-known methods. Relevance of the one or more files to the meeting can be based additionally or alternatively on file usage activity, such as file access by users of the shared workspace in advance of the meeting. Thus, the file access activities of users that are invited to a meeting within a period of time in advance of the meeting can be utilized as inputs to the notification definition for determining that certain files are relevant to the meeting. This is an example of workspace information 380 regarding the actions of a first user of the shared workspace being utilized as a basis for generation of a notification for a second user of the shared workspace.

Figure 6A:
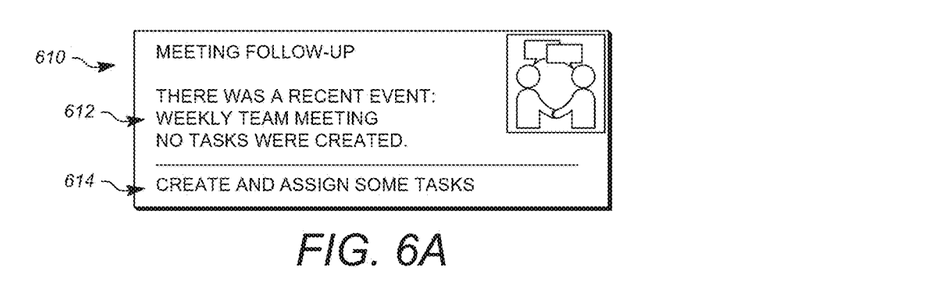
FIGS. 6A-6D are examples of notification cards that can be output for display at the workspace interface screen of FIG. 5.

FIG. 6A shows a second example notification card 610. The second example notification card 610 includes a notification message 612 and an interface element 614 for creating one or more new tasks using the task tracking system 370. The notification message 612 in this example includes a reference to at least one event from the event scheduling system 360, by stating that "there was a recent event" and includes a message based on task information from the task tracking system 370, by stating "no tasks were created." This notification can be output based on a notification definition that utilizes event information and task tracking information as inputs, by detecting, based on the event information, that an event occurred, and by detecting, based on the task tracking information, that no tasks were created subsequent to the meeting. The interface element 614, when executed (e.g. clicked or tapped) by the user can cause display of an interface screen for the task tracking system 370. In some implementations, a new task can be created based on the event information, and/or other related information. Thus, for example, when the interface element 614 is executed, the interface screen for the task tracking system 370 can be output for display, showing a newly-created task populated with information related to the meeting based on the event information. Additional types of information can be pre-populate, such as suggested users for each task, where those users are selected based on the workspace information 380, by information that suggests that the suggested user is knowledgeable regarding the subject matter of the task.

Figure 6B:
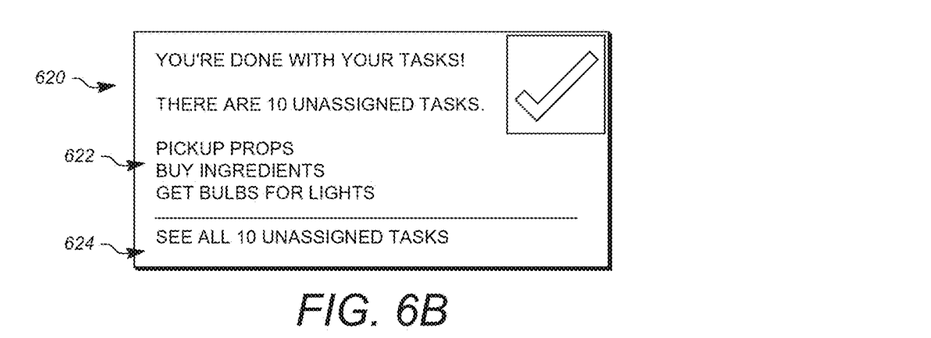

FIG. 6B shows a third example notification card 620. The third example notification card 610 includes a notification message 622 and an interface element 624 for viewing tasks using the task tracking system 370. In this example, the notification message informs the user that no tasks are currently assigned to the user, and that there are tasks that have been created but have not yet been assigned to any user. In this example, the notification can be generated by the notification generator 400 based in part on the task tracking information, upon determining that the user has not tasks assigned to them while one or more tasks remain unclaimed. In this example, the notification message 622 lists three specific tasks that are not assigned, and the interface element 624 indicates that there is a total of ten unassigned tasks. In some implementations, the notification message 622 can be created by the notification generator 400, during processing of the notification definition that corresponds to the notification, based further in part on information regarding actions taken by the user at the shared workspace. This information can be any manner of information included in the workspace information 380. For example, document editing information, messaging information, and/or discussion information regarding the user can be compared to the unassigned tasks, by a technique such as semantic similarity, to identify those tasks that are most relevant to the user and the user's competencies. Other types of information can be utilized for this purpose.

Figure 6C:
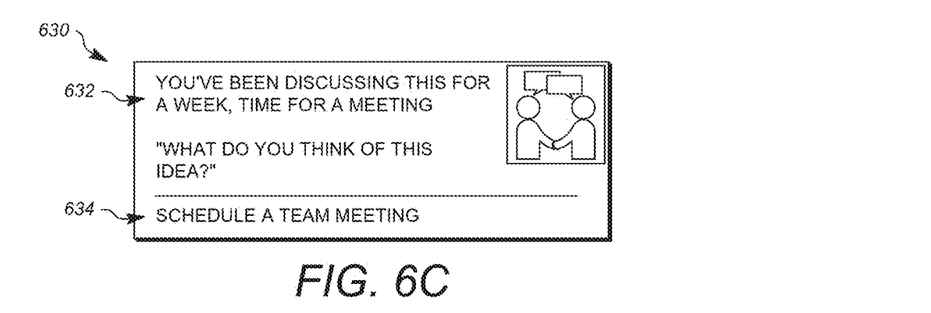

FIG. 6C shows a fourth example notification card 630. The fourth example notification card 630 includes a notification message 632 and an interface element 634 for scheduling a meeting using the event scheduling system 360. The notification message 632 indicates that the group has been actively discussing a topic, and suggests creation of a meeting for further discussion, via the interface element 634. This notification can be output by notification generator using the workspace information 380, such as messaging information from the messaging system 340. The fourth example notification card can be identified where the notification generator 400, using one of the notification definitions 420, identifies one or more discussions, comments, or other types of messages that are related to a particular subject. The decision to output this notification can be made, per the respective notification definition, based on criteria such as exceeding a threshold number of instances where the topic is mentioned in discussion items in a time period, or exceeding a cumulative amount of time expended by all users writing discussion items.

Figure 6D:
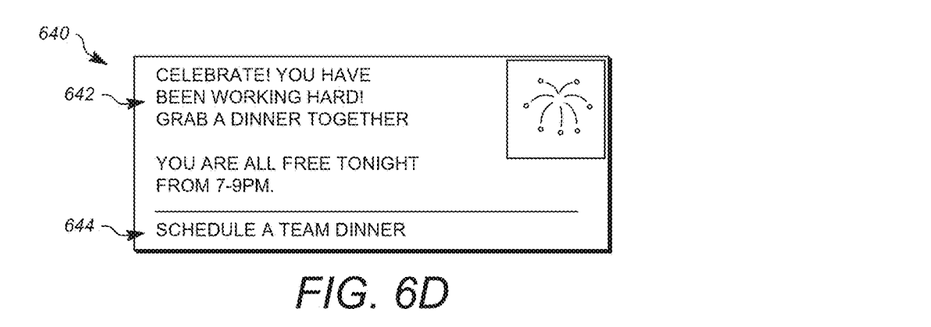

FIG. 6D shows a fifth example notification card 640. The fifth example notification card 640 includes a notification message 642 and an interface element 644. The fifth example notification card 640 suggests that a team dinner be created, and notes that all team members are available during a certain time period. The interface element 644 can be operable to create an event with the description ("team dinner") and the suggested time pre-populated into a new event item in the event scheduling system 360. The notification definition utilized by the notification generator 400 to generate this notification can utilize as inputs some or all of information describing the amount of activity performed by all team members during a specific period, where the notification is only generated if a threshold amount of activity is satisfied, and event scheduling information showing that all team members are available. Other information can be utilized in the context of a notification definition for generating this notification. For example, the physical locations of each group member can be utilized as an input, where the notification is only generated if a threshold number of the team members are located in the same geographic area. Thus, the notification generator, based on the respective notification definition, would not output this notification to groups that are geographically dispersed.

The above notification cards and their inputs and conditions are given as examples. Other notifications can be generated and output for display, and the various types of information and conditions are examples, and other types of information and conditions can be utilized in various combinations.

Figure 7:
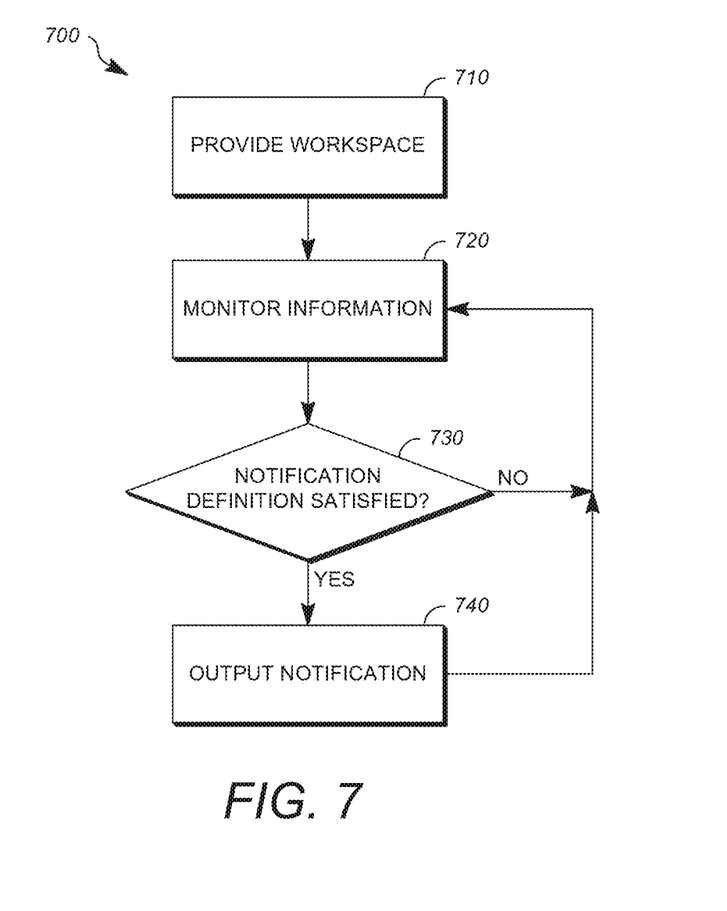
FIG. 7 is a flowchart showing an example of a process for generating notifications in a shared workspace.

FIG. 7 is a flow chart showing a process 700 for generating notifications in a shared workspace. The operations described in connection with the process 700 can be performed at one or more computers, such as at the one or more server computers 140 of the workspace service 130. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of a respective one of the server computers 140 and be executable by the CPU 210 thereof.

At operation 710, a shared workspace is provided. The shared workspace can be provided for facilitating collaborative work by a plurality of users who are granted access to the shared workspace. The shared workspace can include various components and systems for facilitating collaborative work, such as the components and systems described with respect to the workspace service. The shared workspace can be provided for example by the workspace service 130, executed by the one or more server computers 140, for access via the network 150 by the user system 110 and the additional group member systems 120.

At operation 720, information is monitored. Information can be monitored for example, in the manner explained with respect to the workspace manager 310 of FIG. 3, by receiving information from the various systems and components of the workspace service 130. The information monitored at operation 720 can be output as described with respect to the workspace information 380, for further processing.

At operation 730, a determination is made as to whether a notification definition is satisfied. This can be performed, for example, as described with respect to the notification generator 400 of FIG. 4, by processing the workspace information 380 against the notification definitions 420. If it is determined at operation 730 that at least one notification definition is satisfied, the process continues to operation 740, where a notification is output, such as in the manner described with respect to the notification 410. If it is determined that no notification definitions are satisfied, the process returns to operation 720.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
   providing, by a server computer, a shared workspace for facilitating collaborative work of users interacting with the shared workspace through services, wherein the services comprise a messaging service, a discussion service, an event scheduling service, a document storage system, a document editing system, and a task tracking service;
   aggregating information received from the services as workspace information, wherein the workspace information comprises information about messaging sessions in the messaging service, comments and posts in the discussion service, events in the event scheduling service, tasks in the task tracking service, files stored in the document storage system and edited in the document editing system, users that access the files, duration of access of the files, and editing activity associated with the files;
   determining whether the workspace information meets a condition, wherein the condition is based on workspace information from the event scheduling service and the task tracking service, workspace information about an upcoming pre-existing event associated with the event scheduling service, workspace information about tasks indicating that a user has no tasks, workspace information about the users that access the files, workspace information about the duration of access of the files, and workspace information about the editing activity associated with the files; and
   when the condition is met, outputting, for display to at least one of the users, a notification,
   when the condition is based on workspace information from the event scheduling service and the task tracking service, the notification suggests creation of a new event,
   when the condition is based on workspace information about the upcoming pre-existing event associated with the event scheduling service, the notification includes interface elements to access files in the document storage system relevant to the upcoming pre-existing event based on access of the files by users of the shared workspace,
   when the condition is based on workspace information about tasks indicating that a user has no tasks, the notification includes at least one of a list of available tasks from the task tracking service or an interface element for creating a new task, and
   when the condition is based on a threshold number of times a subject is mentioned in the messaging service, the notification includes at least one of a message indicating the threshold and an interface element to create an event in the event scheduling service.

2. The method of claim 1, wherein when the condition is based on the workspace information about tasks indicating that a user has no tasks and the notification includes an interface element for creating a new event, the interface element, when activated, creates a new event in the event scheduling service based on the workspace information from the event scheduling service and the task tracking service.

3. The method of claim 1, wherein the services comprise an electronic mail service, and wherein the workspace information comprises information about mail messages in the electronic mail service relating to the shared workspace.

4. A non-transitory computer-readable storage medium comprising executable instructions that, when executed by a processor, facilitate performance of operations, comprising:
   providing, by a server computer, a shared workspace for facilitating collaborative work of users interacting with the shared workspace through services, wherein the services comprise a messaging service, a document storage system for storing files, a document editing system for editing the files, a discussion service, an event scheduling service, and a task tracking service;
   providing, by the server computer, a user interface for the shared workspace, wherein the user interface includes interface elements allowing a user of the shared workspace to interact directly with the document storage system and at least some of the other services;
   aggregating information received from the services as workspace information, wherein the workspace information comprises information about messaging sessions in the messaging service, comments and posts in the discussion service, events in the event scheduling service, tasks in the task tracking service, files stored in the document storage system and edited in the document editing system, users that access the files, duration of access of the files in the document storage system and the document editing system, editing activity of the files in the document editing system, and users interacting with the services;
   monitoring the workspace information;
   receiving a transcript from the messaging service;
   performing a substantive analysis of the workspace information, the transcript, and the files in the document storage system and the document editing system to determine subjects described in textual information of the workspace information; and determining whether the workspace information and the subjects meet a condition, wherein the condition is based on the subjects, workspace information from the event scheduling service and the task tracking service, workspace information about an upcoming pre-existing event associated with the event scheduling service, workspace information about tasks indicating that a user has no tasks, workspace information about the users that access the files, workspace information about the duration of access of the files, and workspace information about the editing activity associated with the files; and when the condition is met, outputting, for display in the user interface for the shared workspace to at least one of the users, a notification when the condition is based on workspace information from the event scheduling service and the task tracking service, the notification suggests creation of a new event, when the condition is based on workspace information about the upcoming pre-existing event associated with the event scheduling service, the notification includes interface elements to access files in the document storage system relevant to the upcoming pre-existing event based on access of the files by users of the shared workspace, when the condition is based on workspace information about tasks indicating that a user has no tasks, the notification includes at least one of a list of available tasks from the task tracking service or an interface element for creating a new task, and when the condition is based on a threshold number of times a subject is mentioned in the messaging service, the notification includes at least one of a message indicating the threshold and an interface element to create an event in the event scheduling service.

5. The non-transitory computer-readable storage medium of claim 4, wherein information about the editing activity identifies editing actions with respect to a file including a duration over which the file was edited, a number of characters added to the file, a number of characters modified in the file, substantive content added to the file, and substantive content modified in the file, and the notification comprises an interface element to access the file in the document storage system.

6. The non-transitory computer-readable storage medium of claim 4, wherein the notification comprises a reference to the file and the upcoming pre-existing event.

7. The non-transitory computer-readable storage medium of claim 4, wherein the services comprise an event scheduling service and a task tracking service, and wherein the notification comprises a reference to an event associated with the event scheduling service and an interface element for creating a new task, distinct from and unrelated to the task, using the task tracking service.

8. A system comprising:
a processor, and
a memory that stores executable instructions, that, when executed by the processor, facilitate performance of operations, comprising:

providing a shared workspace for facilitating collaborative work of users interacting with the shared workspace through services, wherein the services comprise a messaging service, a discussion service, an event scheduling service, a document storage system for storing files, a document editing system for editing the files, and a task tracking service;

aggregating information received from the services as workspace information, wherein the workspace information comprises information about messaging sessions in the messaging service, comments and posts in the discussion service, events in the event scheduling service, tasks in the task tracking service, files stored in the document storage system and edited in the document editing system, users that access the files, duration of access of the files, and editing activity associated with the files, and users interacting with the services;

monitoring the workspace information;

determining whether the workspace information meets a condition, wherein the condition is based on workspace information from the event scheduling service and the task tracking service, workspace information about an upcoming pre-existing event associated with the event scheduling service, workspace information about the users that access the files, workspace information about the duration of access of the files, and workspace information about the editing activity, and at least one of a threshold number of events being scheduled in the event scheduling service in a specified time period, a determination indicating that a user has no tasks, or a determination indicating that a file associated with the document storage system and the upcoming pre-existing event associated with the event scheduling service are related; and when the condition is met, outputting, for display to at least one of the users, a notification, when the condition is based on workspace information from the event scheduling service and the task tracking service, the notification suggests creation of a new event, when the condition is based on workspace information about the upcoming pre-existing event associated with the event scheduling service, the notification includes interface elements to access files in the document storage system relevant to the upcoming pre-existing event based on access of the files by users of the shared workspace, when the condition is based on workspace information about tasks indicating that a user has no tasks, the notification includes at least one of a list of available tasks from the task tracking service or an interface element for creating a new task, and when the condition is based on a threshold number of times a subject is mentioned in the messaging service, the notification includes at least one of a message indicating the threshold and an interface element to create an event in the event scheduling service.

* * * * *